(12) United States Patent
Schaeuble et al.

(10) Patent No.: US 10,710,556 B2
(45) Date of Patent: Jul. 14, 2020

(54) WIPER BLADE FOR CLEANING VEHICLE WINDSCREENS

(75) Inventors: Michael Schaeuble, Vaihingen/Enz (DE); Bruno Egner-Walter, Heilbronn (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 1553 days.

(21) Appl. No.: 13/806,857

(22) PCT Filed: Jun. 28, 2011

(86) PCT No.: PCT/EP2011/060783
§ 371 (c)(1),
(2), (4) Date: Dec. 26, 2012

(87) PCT Pub. No.: WO2012/000972
PCT Pub. Date: Jan. 5, 2012

(65) Prior Publication Data
US 2013/0097801 A1    Apr. 25, 2013

(30) Foreign Application Priority Data
Jun. 30, 2010    (DE) .................. 10 2010 025 687

(51) Int. Cl.
*B60S 1/40*    (2006.01)
*B60S 1/52*    (2006.01)
*B60S 1/38*    (2006.01)

(52) U.S. Cl.
CPC .......... *B60S 1/4067* (2013.01); *B60S 1/3805* (2013.01); *B60S 1/524* (2013.01); *B60S 1/381* (2013.01);
(Continued)

(58) Field of Classification Search
CPC .... B60S 1/3849; B60S 1/4041; B60S 1/4045; B60S 1/3805; B60S 1/40; B60S 1/3867;
(Continued)

(56) References Cited

U.S. PATENT DOCUMENTS

2003/0009841 A1*    1/2003 Sato ................... B60S 1/3415
15/250.04

FOREIGN PATENT DOCUMENTS

DE    10 2007 062304 A1    6/2009
DE    10 2008 021457 A1    11/2009
(Continued)

OTHER PUBLICATIONS

Machine Translation WO2010034445.*
International Search Report from PCT/EP2011/060783 dated Aug. 29, 2011 (3 pages).

*Primary Examiner* — Gary K. Graham
(74) *Attorney, Agent, or Firm* — Osha Liang LLP

(57) ABSTRACT

A wiper blade (10; 10a to 10c) with, attached to a wiper arm (1), a wiper arm side adapter (11) to which the wiper blade (10; 10a to 10c) can be interchangeably attached, with, arranged on a wiper blade (10; 10a to 10c), a wiper blade side adapter (12) which interacts with the wiper arm side adapter (11), whereby the wiper blade side adapter (12) comprises a wiper blade side adapter section (24) and, swivel-mounted on a wiper blade side adapter section (24), a wiper arm side adapter section (23; 23c) which interacts with the wiper arm side section (11), with nozzle openings arranged on the wiper blade (10; 10a to 10c) and with, arranged on the wiper arm side adapter section (23; 23c), a hydraulic plug-type connection (20; 60; 70).

12 Claims, 7 Drawing Sheets

Figure 1:
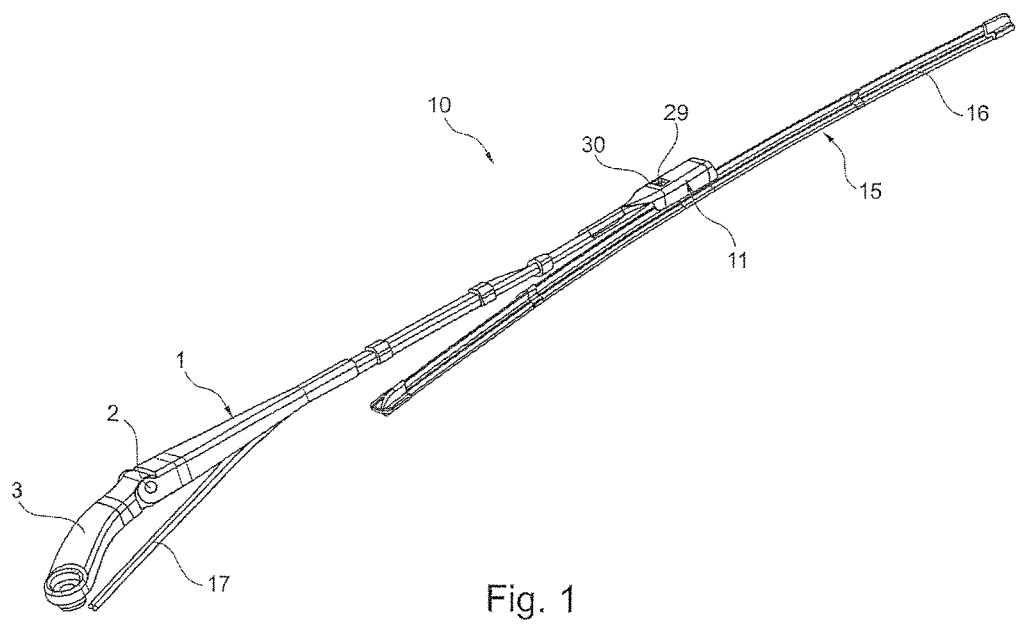

(52) U.S. Cl.
CPC ............ *B60S 1/3862* (2013.01); *B60S 1/3879* (2013.01); *B60S 1/4048* (2013.01); *B60S 2001/4054* (2013.01)

(58) Field of Classification Search
CPC ............ B60S 1/3862; B60S 2001/4054; B60S 1/4048; B60S 1/524; B60S 1/4038
USPC .......................... 15/250.32, 250.04, 250.02, 15/250.05–250.09, 250.43, 250.44, 15/250.361
See application file for complete search history.

(56) References Cited

FOREIGN PATENT DOCUMENTS

| | | |
|---|---|---|
| DE | 10 2008 049269 A1 | 4/2010 |
| WO | 2010/034447 A1 | 4/2010 |
| WO | WO 2010034445 A1 * 4/2010 ............. B60S 1/381 |  |

* cited by examiner

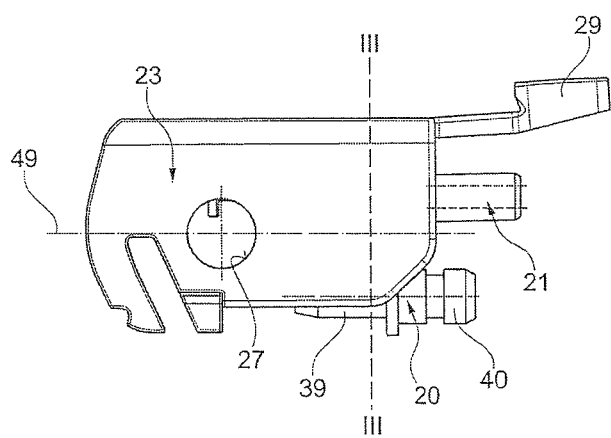
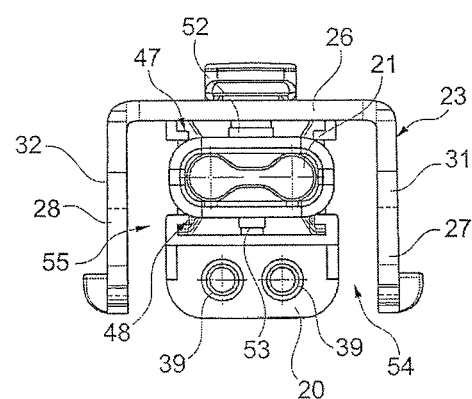
Fig. 2
Fig. 3

WIPER BLADE FOR CLEANING VEHICLE WINDSCREENS

PRIOR ART

The invention relates to a wiper blade for cleaning vehicle windscreens in accordance with the introductory section of claim 1.

A wiper blade of this type is known from DE 10 2008 049 269 A1 by the applicant. In the known wiper blade the adapter on the wiper blade side comprises a first adapter section on the wiper blade side that is swivel-connected to a second adapter section on the wiper arm side. Here, both a hydraulic plug-type connection and an electrical plug-type connection are arranged on the adapter section on the wiper blade side. The two plug-type connections are for supplying the wiper blade with a cleaning and washing fluid and electrical current for heating the wiper blade respectively. The essential feature here is that said plug-type connections are arranged in the adapter section on the wiper arm side integrally or in one piece. For a manufacturer of wiper blades this means a relatively large number of wiper arm side adapter components for adaptation to different vehicle and vehicle models. Furthermore, there are wiper blades in which the supply of the wiper blade with cleaning and washing fluid is envisaged, but not heating of the wiper blade. In this case too a separate adapter section is required on the wiper arm side.

DISCLOSURE OF THE INVENTION

On the basis of the described prior art, the object of the invention is to further develop a wiper blade for cleaning vehicle windscreens in accordance with the introductory section of claim 1 in such a way that simple adaptation of the wiper blade to different applications is made possible.

This is achieved in accordance with the characterising section of claim 1 in that the hydraulic plug-type connection is designed as a separate component from the adapter section on the wiper arm side and is connected to it by means of a form-fitting connection. In other words, this means that for the most varied applications one and the same wiper arm side adapter component can be used which can be combined with various hydraulic plug-type connections. Through the form-fitting connection particularly simple and secure assembly is made possible without the need for additional fastening elements.

Advantageous embodiments of the wiper blade for cleaning vehicle windscreens in accordance with the invention are set out in the sub-claims. All combinations of at least two of the features disclosed in the claims, the description and/or the figures fall under the scope of the invention.

In a preferred form of embodiment of the invention it is envisaged that the hydraulic plug-type connection is directly connected to the wiper arm side adapter section in a form-fitting manner. In this way a particularly compact assembly of the wiper blade side adapter through dispensing with additional, separate connection elements, and a particularly secure connection between the hydraulic plug-type connector and the wiper arm side adapter section are made possible.

The invention can also be used in the case of a wiper blade which is designed as a heated wiper blade and via an electrical plug-type connection arranged on the wiper arm side adapter section can be electrically connected to a connection assigned to the wiper arm.

Here, in accordance with the invention it is preferably envisaged that the electrical plug-type connection is connected to the hydraulic plug-type connection by means of a further form-fitting connection. In this way the principle of the connection of the hydraulic plug-type connection is also transferred to the electrical plug-type connection, so that various electrical plug-type connections can be used on one and the same wiper arm side adapter section.

Particularly preferably it is envisaged that the form-fitting connection and/or the additional form-fitting connection is designed as a groove/spring connection. This type of form-fitting connection allows relatively long guidance between the elements involved and thereby also particularly precise and secure guidance.

In this way a particularly compact wiper arm side adapter with simultaneously simple assembly of the components can be achieved if the relative movement the wiper arm side adapter section and the hydraulic plug-type connection and/or the electrical plug-type connection of the groove/spring connection takes place in the longitudinal direction of the wiper blade.

An assembly sequence, in which the electrical plug-type connection on the wiper arm side adapter section (via the groove/spring connection) and the hydraulic plug-type connection on the wiper blade side adapter section takes place in separate steps, whereby the two adapter sections are connected to each other, whereby at the same time the connection between the electrical plug-type connection and the hydraulic plug-type connection takes place, is achieved if the additional form-fitting connection is designed as snap connection with a snap-hook and recess for the snap-hooks.

In order, in the event of a defect and/or leak in the hydraulic plug-type connection, to avoid possible corrosion and/or a short circuit through the penetration of moisture or water into the electrical plug-type connection it is also envisaged that the electrical plug-type connection is arranged on the side of the hydraulic plug-type connection facing the wiper arm side adapter section. In this way water emerging from the hydraulic plug-type connection flows directly in the direction of the vehicle windscreen and not onto the electrical plug-type connection.

Further advantage, features and details of the invention are set out in the following description of preferred examples of embodiment, as well as by means of the drawings, wherein FIG. 1 shows a perspective view of a wiper blade attached to a wiper arm in accordance with the invention FIG. 2 shows a side view of wiper arm side adapter section with a hydraulic plug-type connection and an electrical plug-type connection arranged therein FIG. 3 shows a section along plane III-III in FIG. 2

Figure 4:
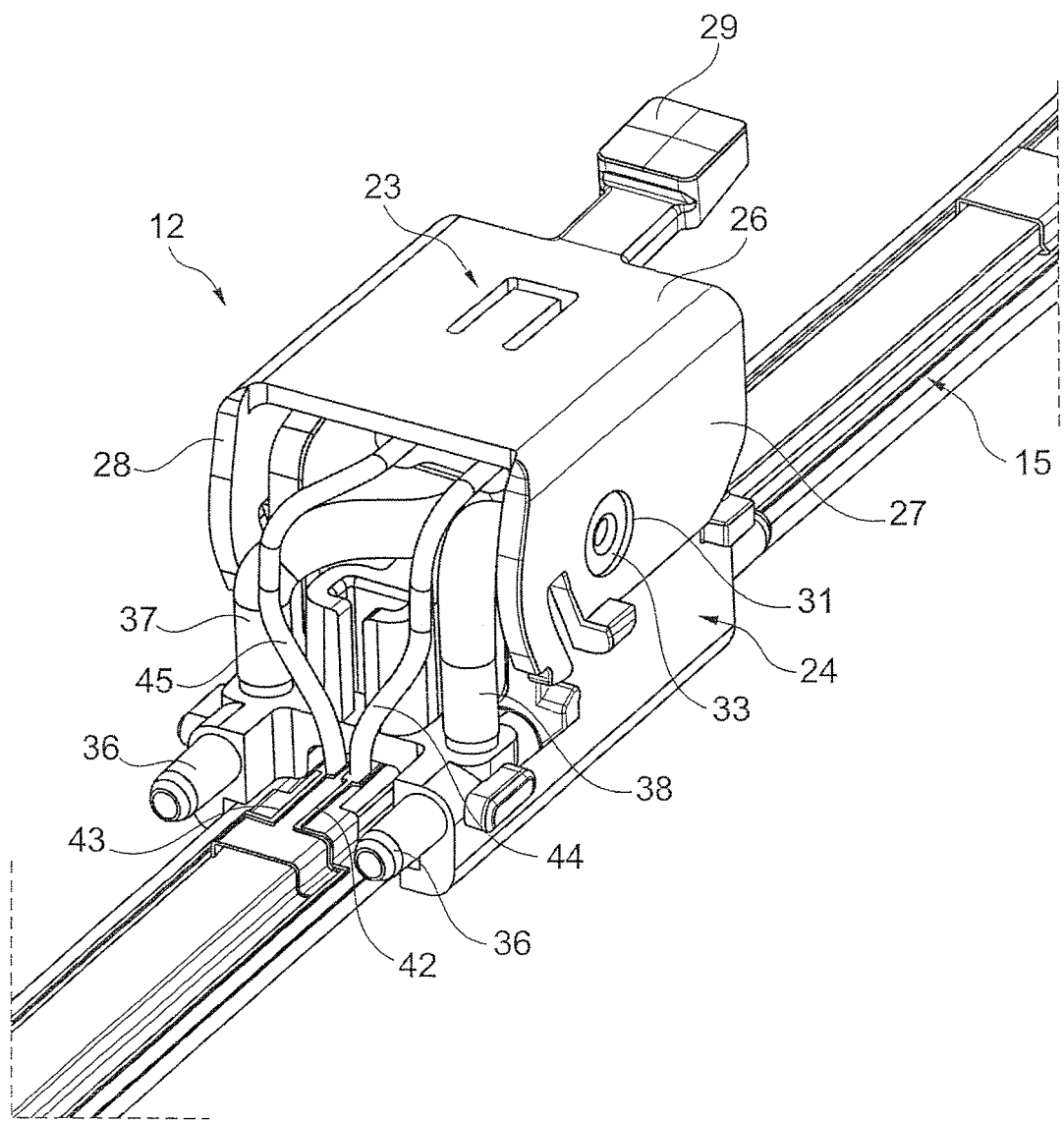

FIG. 4 shows a perspective view of a wiper blade side adapter

Figure 5:
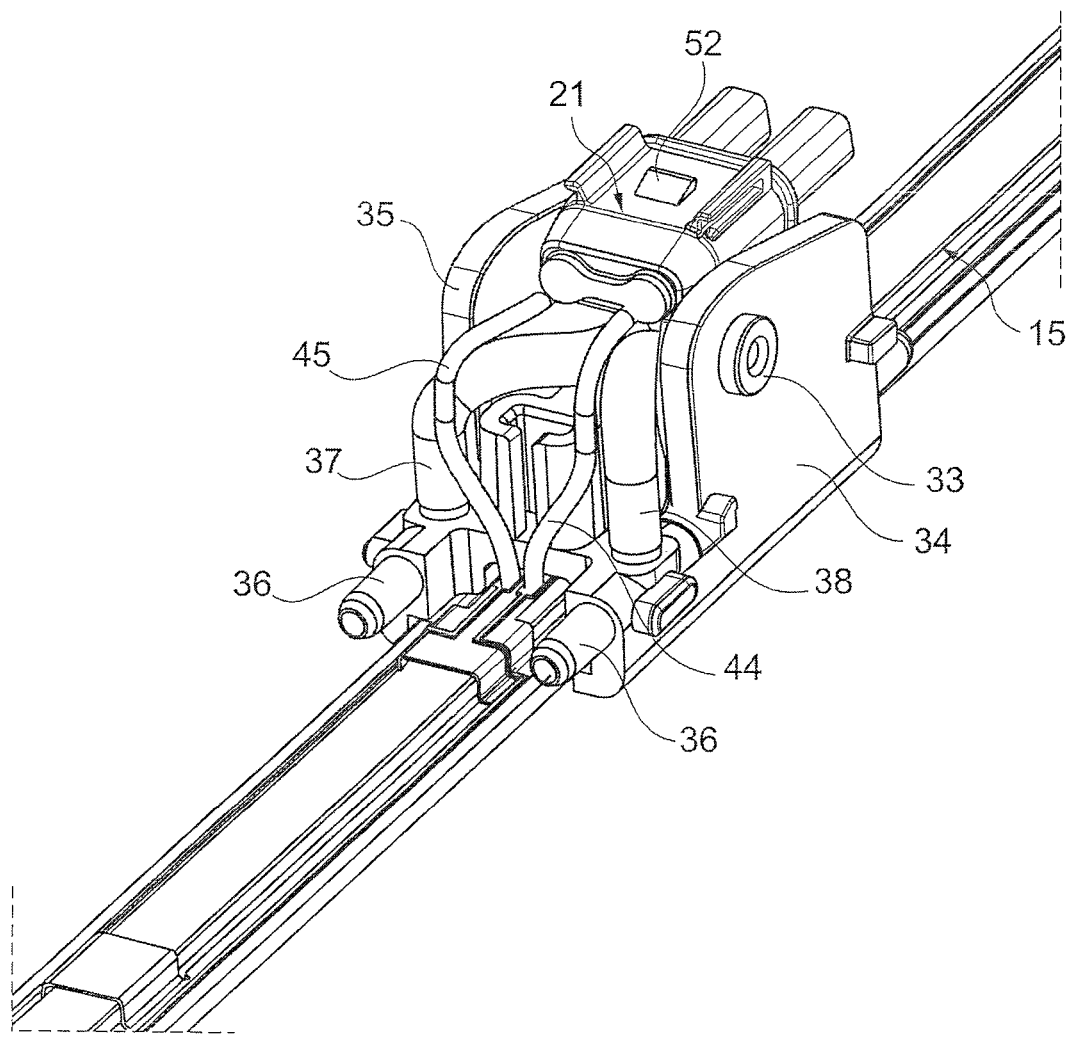
Figure 6:
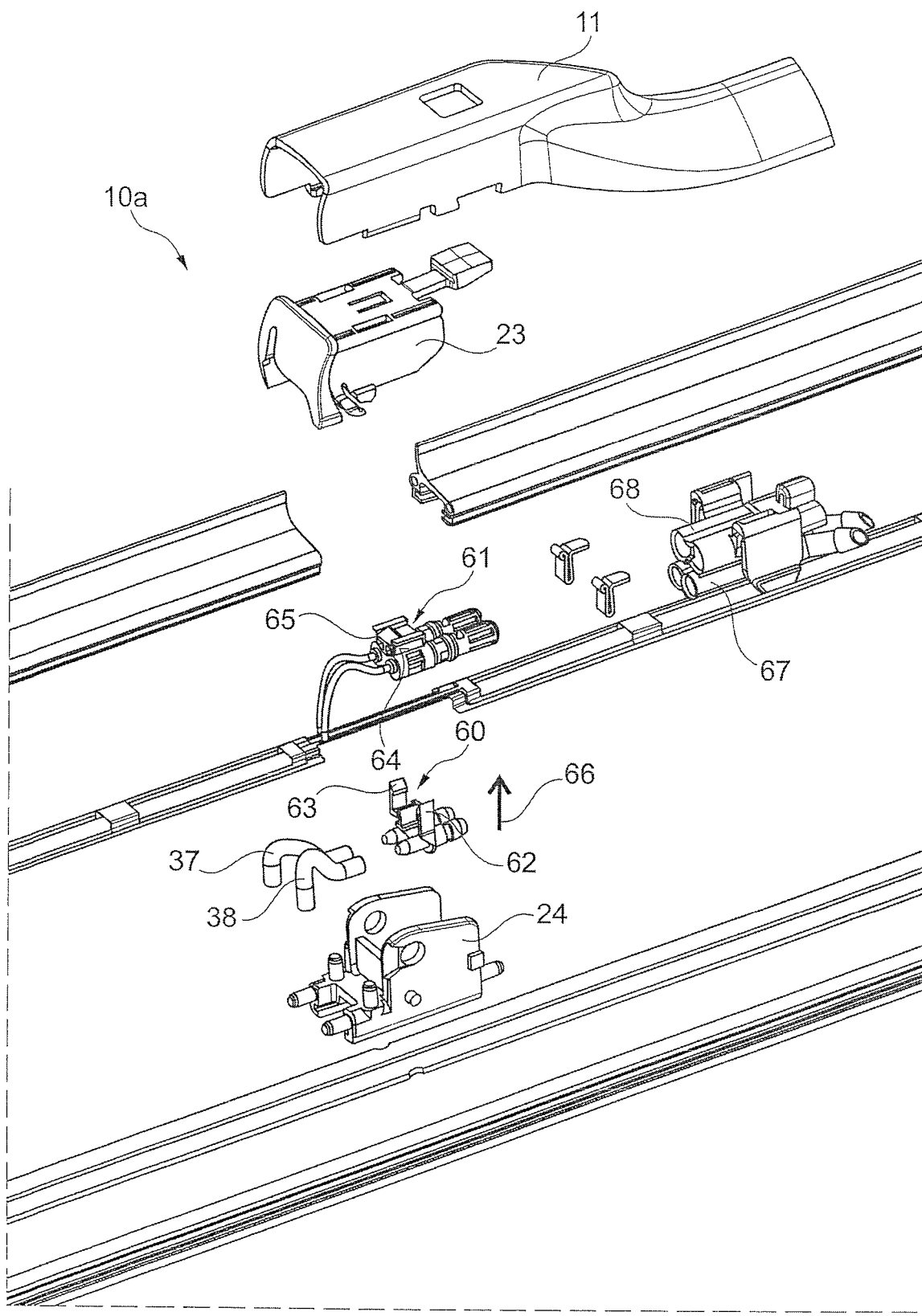
Figure 7:
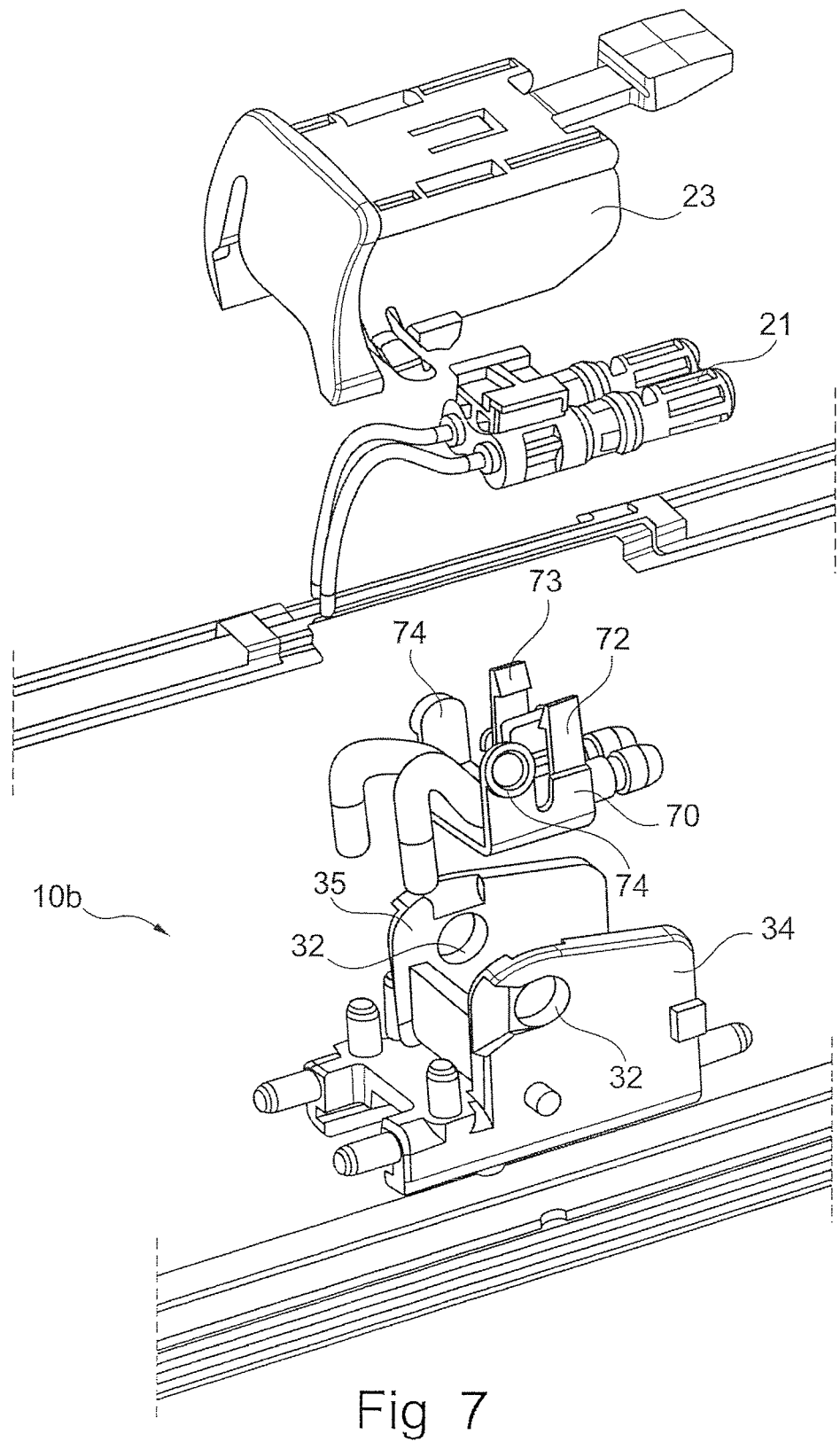
Figure 8:
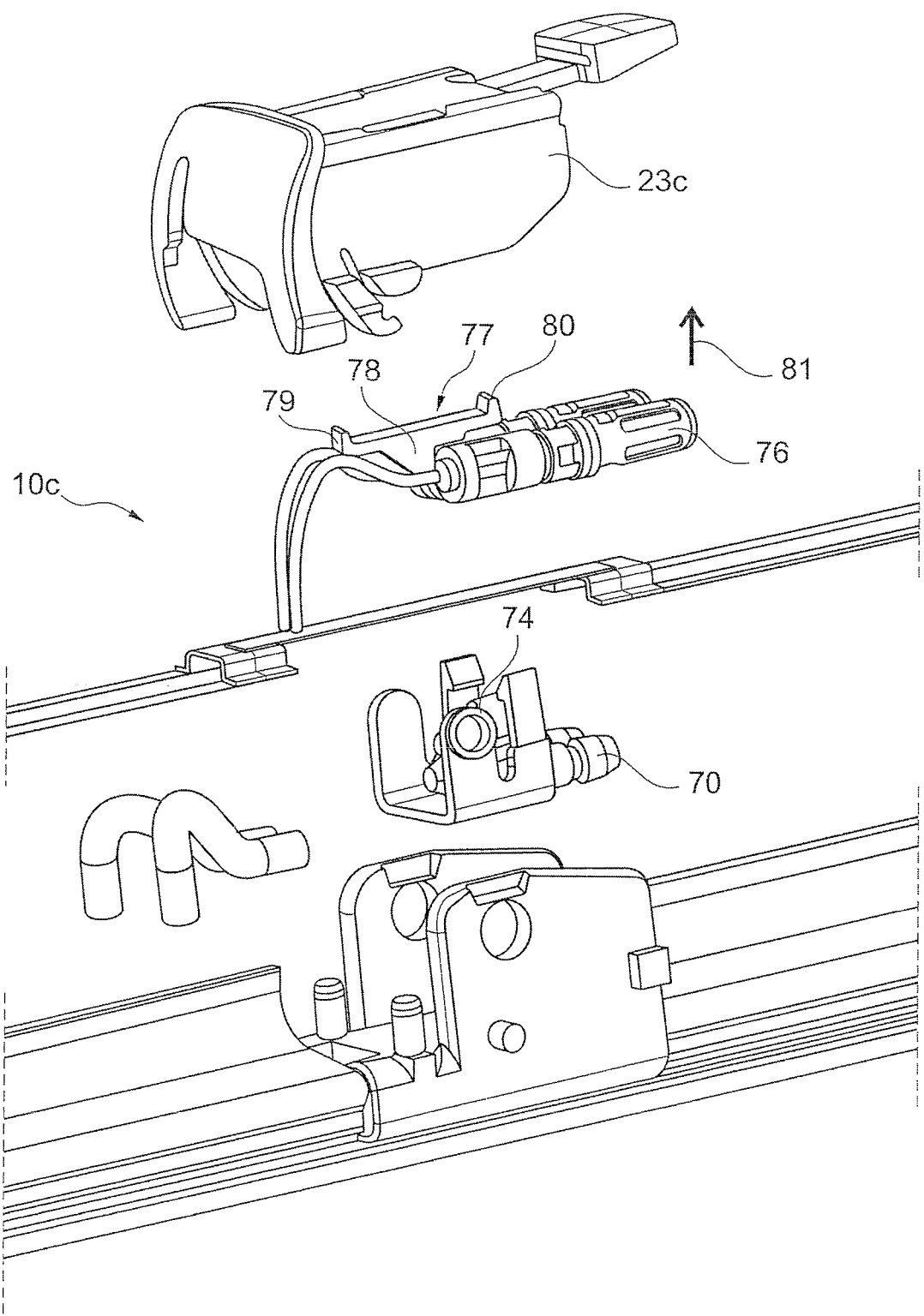

FIG. 5 shows a perspective view of the adapter in accordance with FIG. 4 without the wiper arm side adapter section FIG. 6 shows an exploded view of individual components of the wiper blade in accordance with the invention in a first modified form of embodiment of the invention FIG. 7 shows a perspective view of a second modified wiper blade in accordance with the invention FIG. 8 shows a perspective view of a third modified wiper blade.

Identical components and/or components with an identical function are provided with the same reference numbers in the figures.

FIG. 1 shows a first wiper blade 10 in accordance with the invention for cleaning vehicle windscreens. Here, the wiper blade 10 is interchangeably attached to a wiper arm 1, whereby the wiper arm 1 is swivel-connected via a wiper arm joint 2 to a bearing element 3. The bearing element 3 is in turn connected to a shaft of a wiper drive, which is not shown.

For attaching the wiper blade 10 to the wiper arm 1, the wiper arm 1 has a wiper arm side adapter 11 arranged on the wiper arm 1. The wiper arm side adapter 11 is coupled by means of wiper blade side adapter 12 arranged on the wiper blade 10 to the wiper arm side adapter 11 (FIG. 4), more particularly by means of a snap connection.

The wiper blade 10 has a wiper blade body 15 which on the side facing the vehicle windscreen has a wiping lip 16. The wiper blade body 15 has nozzle openings, not shown in more detail in FIG. 1, for spraying a washing and cleaning fluid. This washing and cleaning fluid is supplied in a known manner to the wiper blade body 15 via a tube connection 17, guided in the wiper arm 1, whereby the tube 17 is hydraulically connected via a hydraulic plug-type connection 20 assigned to the wiper blade side adapter 12. In the example of embodiment it is also envisaged that the wiper blade body 15 can be heated, which takes place via an electric plug-type connection 21 also arranged in the wiper blade side adapter 12 (FIG. 3).

As can be seen in particular in FIG. 4 the wiper blade side adapter 12 comprises a first, wiper arm side adapter section 23 and a second, wiper blade side adapter section 24. The two adapter sections 23, 24 are preferably made of plastic in an injection moulding process. In its middle section the wiper arm side adapter section 23 has a U-shaped cross-section with a base 26 and two plate-shaped arms 27, 28 projecting therefrom in the direction of the wiper blade side adapter section 24. Also seen formed on the base 26 in one piece is a snap hook 29, which engages in a form-fitting manner with a recess 30 (FIG. 1) arranged on the wiper arm side adapter 11 in order to bring about said snap connection between the wiper blade 10 and the wiper arm 1.

In the arms 27, 28 of the wiper arm side adapter section 23 there are openings 31, 32 into which the bearing pins 33 of the wiper blade side adapter section 24 engage. By way of the openings 31, 32 and the bearing pins 33 the two adapter sections 23, 23 are swivel-mounted with regard to each other. The bearing pins 22 are on bearing plates 34, 35 arranged close to the arms 27, 28 (FIG. 5).

Arranged and/or formed on the wiper blade side adapter section 24 there are fluid connections 36 via which the wiper blade body 15 and/or its nozzle openings are supplied with the cleaning and washing fluid. These fluid connections 36 are connected via tubes 37, 38 visible in FIG. 4 to a first connector 39 of the hydraulic plug-type connector 20. The hydraulic plug-type connection 20 has second connectors 40 via which the hydraulic plug-type connection 20 is connected to the tube 17.

In FIG. 4 heating leads 42, 43 in the form of conductor leads can be see which are connected by means of electrical connection leads 44, 45 to the electrical plug-type connection 21 seen in FIGS. 2 and 3. The electrical plug-type connection 21 is in turn connected with a plug-type connector, not shown in the figures, to a wiper arm side power line.

As can be seen in particular in FIG. 3, both the hydraulic plug-type connection 20 and the electrical plug-type connection 21 are connected by means of a form-fitting connection 47, 48 to the wiper arm side adapter section 23. In accordance with FIG. 3, between the electrical plug-in connection 21 and the base 26 of the wiper arm side adapter section 23, the first form-fitting connection 47 is in the form of a groove/spring connection on the two longitudinal sides of the electrical plug-in connection 21. The second form-fitting connection 48 is between the hydraulic plug-type connection 20 and the electrical plug-type connection 21, also in the form of a groove/spring connection on the corresponding longitudinal sides. The arrangement of the two form-fitting connections 47, 48 is such that in order to assemble the hydraulic plug-type connection 20 and the electrical plug-type connection 21 these are assembled in the longitudinal axis, marked 49 in FIG. 2, of the wiper arm side adapter section 23. Here, the longitudinal axis 49 is arranged/aligned in the direction of the longitudinal axis of the wiper blade body 15.

In addition to the groove/spring connection the two form-fitting connections 47, 48 also each have a snap connection, for which the hydraulic plug-type connector 20 and the electrical plug-type connector 21 each have a catch 52, 53 formed on their casing which interact with corresponding recesses in the base 26 and in the electrical plug-type connection 21. Through the snap connections the hydraulic plug-type connection 20 and the electrical plug-type connection 21 are positioned and/or secured in their relevant end position.

With the aid of FIG. 3 in particular it can still be seen that with the simultaneous arrangement of a hydraulic plug-type connection 20 and an electrical plug-type connection 21, the electrical plug-type connection 21 is arranged side of the hydraulic plug-type connection 20 facing the base 26. In other words this means that when the wiper blade 20 is assembled the hydraulic plug-type connection 20 is always arranged in the direction towards the vehicle windscreen. In addition, in FIG. 2 slit-like intermediate spaces 54, 55 can still be seen between the arms 27, 28, the hydraulic plug-type connection 20 and the electric plug-type connection 21, into which the bearing plates 34, 35 of the wiper blade side adapter section 24 engage.

In FIG. 6 a second example of embodiment of the invention is shown. Here the wiper blade 10a has a hydraulic plug-type connection 60 which has two snap hooks 62, 63 projecting in the direction of the electrical plug-type connection 61. The snap hooks 62, 63 engage in recesses 64, in the electrical plug-type connection 61 in a form-fitting manner. In contrast to the wiper blade 10, in the case of wiper blade 10a it is envisaged that although the hydraulic plug-type connection 61 still has a form-fitting connection, this is designed as a snap connection by means of the snap hooks 62, 63. Here, the direction of assembly of the hydraulic plug-type connection 60 is, in accordance with the arrow 66, perpendicular to the extent of the electrical plug-type connection 61 or the longitudinal axis of the wiper blade 10. In FIG. 6 the wiper arm side counter plug 67, 68 for connection with the hydraulic plug-type connection 60 and electrical plug-type connection 61 respectively can be seen.

FIG. 7 shows a further modified form of embodiment of the invention with a wiper blade 10b. The essential feature here is that its hydraulic plug-type connection 70 has, in addition to the snap hooks 72, 73 known from wiper blade 10a, hollow cylindrical bearing points 74, with which the hydraulic plug-type connection 70 is swivel-mounted in the openings 32 of the bearing plates 34, 35.

In FIG. 8 and a further modified form of embodiment with a wiper blade 10c is shown. Here the wiper blade 10c has a hydraulic plug-type connection 70 corresponding to wiper blade 10b. However, the electrical plug-type connection 72 is not connected to the wiper arm side adapter section 23c via a groove/spring connection as a form-fitting connection, but via a snap connection 77. For this the electrical plug-type connection 76 has a connection plate 78 with two guide pins 79, 80 which interact with a counter guide (not shown)

formed in the wiper arm side adapter section 23*c*. Here the direction of assembly of the electrical plug-type connection 76 is, in accordance with the arrow 81, perpendicular to the extent of the wiper arm side adapter section 23*c* and/or the longitudinal axis of wiper blade 10*c*.

The wiper blades 10, 10*a* to 10*c* described so far can be modified in many different ways without departing from the concept of the invention. Thus, in particular, it is also conceivable to provide the wiper 10, 10*a* to 10*c* without an electrical plug-type connection 21, 61 and 76 respectively. In this case the hydraulic plug-type connection is coupled directly to the wiper arm adapter section 23, 23*c*.

LIST OF REFERENCE NUMBERS

1 Wiper arm
2 Wiper arm joint
3 Bearing element
10, 10*a*-10*c* Wiper blade
11 Wiper arm side adapter
12 Wiper blade side adapter
15 Wiper blade body
16 Wiper lip
17 Tube connection
20 Hydraulic plug-type connection
21 Electrical plug-type connection
23, 23*c* Wiper arm side adapter section
24 Wiper blade side adapter section
26 Base
27 Arm
28 Arm
29 Snap hook
30 Recess
31 Opening
32 Opening
33 Bearing pin
34 Bearing plate
35 Bearing plate
36 Fluid connector
37 Tube connection
38 Tube connection
39 First connector
40 Second connector
42 Heating lead
43 Heating lead
44 Connection line
45 Connection line
47 Form-fitting connection
48 Form-fitting connection
49 Longitudinal axis
52 Catch
53 Catch
54 Intermediate space
55 Intermediate space
60 Hydraulic plug-type connection
61 Electrical plug-type connection
62 Catch
63 Catch
64 Recess
65 Recess
66 Arrow
67 Counter plug
68 Counter plug
70 Hydraulic plug-type connection
72 Snap hook
73 Snap hook
74 Bearing point
76 Electrical plug-type connection
77 Snap connection
78 Connection plate
79 Guide pin
80 Guide pin
81 Arrow

The invention claimed is:

1. A heatable wiper assembly for cleaning vehicle windscreens comprising:
a wiper arm to which a wiper blade is attached;
a wiper arm side adapter to which the wiper blade is interchangeably attached;
a wiper blade side adapter arranged on the wiper blade which interacts with the wiper arm side adapter, whereby the wiper blade side adapter comprises a wiper blade side adapter section and a wiper arm side adapter section swivel-mounted on the wiper blade side adapter section configured to interact with the wiper arm side section,
wherein the wiper arm side adapter section comprises a U-shaped cross-section with a base facing the wiper arm side adapter and two perpendicularly projecting arms;
nozzle openings arranged on the wiper blade for supplying a washing and cleaning fluid;
arranged on the wiper arm side adapter section, a hydraulic plug connection which is connected by way of at least one tube connection line with the wiper blade side adapter section, wherein the hydraulic plug connection is a separate component from the wiper arm side adapter section and is at least indirectly coupled thereto by a form-fitting connection; and
arranged on the wiper arm side adapter section, an electrical plug connection, providing an electrical contact of the wiper blade with a connection assigned to the wiper arm,
wherein the electrical plug connection is connected to the hydraulic plug connection via an additional form-fitting connection,
wherein the electrical plug connection is arranged on the side of the hydraulic plug connection facing the base, and
wherein the electrical plug connection and the hydraulic plug connection are arranged between the two perpendicular projecting arms of the U-shaped cross-section, with the electrical plug connection disposed between the base and the hydraulic plug connection.

2. The heatable wiper assembly in accordance with claim 1, wherein the additional form-fitting connection is designed as snap connection having a snap hook and recesses for the snap hooks.

3. The heatable wiper assembly in accordance with claim 2, wherein the hydraulic plug connection has two bearing elements with which the hydraulic plug connection is swivel-mounted in openings of the wiper blade side adapter section together with the wiper arm side adapter section.

4. The heatable wiper assembly in accordance with claim 1, the electrical plug connection is connected via a snap connection to the wiper arm side adapter section, whereby a direction of assembly of the snap connection runs perpendicularly to the longitudinal axis of the wiper blade and that the hydraulic plug connection has two bearing elements with which it is swivel-mounted in openings of the wiper blade side adapter section together with the wiper arm side adapter section.

5. The heatable wiper assembly in accordance with claim 1, wherein the electrical plug connection is connected to the hydraulic plug connection via an additional form-fitting connection.

6. The heatable wiper assembly in accordance with claim 5, wherein either or both of the form-fitting connection and the additional form-fitting connection have at least one groove/spring connection.

7. The heatable wiper assembly in accordance with claim 6, wherein either or both of the relative movement between the wiper arm side adapter section and the hydraulic plug connection and the electrical plug connection of the groove/spring connection are in the longitudinal direction of the wiper blade.

8. A wiper assembly for cleaning vehicle windscreens comprising:
a wiper arm to which a wiper blade is attached;
a wiper arm side adapter to which the wiper blade is interchangeably attached;
a wiper blade side adapter arranged on the wiper blade which interacts with the wiper arm side adapter, whereby the wiper blade side adapter comprises a wiper blade side adapter section and a wiper arm side adapter section swivel-mounted on the wiper blade side adapter section configured to interact with the wiper arm side section;
nozzle openings arranged on the wiper blade for supplying a washing and cleaning fluid; and
arranged on the wiper arm side adapter section, a hydraulic plug connection which is connected by way of at least one tube connection line with the wiper blade side adapter section, wherein the hydraulic plug connection is a separate component from the wiper arm side adapter section and is at least indirectly coupled thereto by a form-fitting connection, wherein
the wiper arm side adapter section comprises, in the connection area with the hydraulic plug connection, a U-shaped cross-section with a base facing the wiper arm side adapter and two perpendicularly projecting arms, and wherein the form-fitting connection between the hydraulic plug connection and the wiper arm side adapter section is in the area of the base, whereby between the hydraulic plug connection and each of the two arms, an intermediate space in a shape of a slit is formed into which the wiper blade side adapter section engages with two bearing plates.

9. The wiper assembly in accordance with claim 8, wherein the wiper blade is a heatable wiper blade and, via an electrical plug connection arranged on the wiper arm side adapter section, is in electrical contact with a connection assigned to the wiper arm.

10. The wiper assembly in accordance with claim 9, wherein the electrical plug connection is connected to the hydraulic plug connection via an additional form-fitting connection.

11. The wiper assembly in accordance with claim 10, wherein either or both of the form-fitting connection and the additional form-fitting connection have at least one groove/spring connection.

12. The wiper assembly in accordance with claim 11, wherein either or both of the relative movement between the wiper arm side adapter section and the hydraulic plug connection and the electrical plug connection of the groove/spring connection are in the longitudinal direction of the wiper blade.

* * * * *